Jan. 31, 1928.

B. F. FITCH 1,657,618

APPARATUS FOR HANDLING FREIGHT

Filed Nov. 4, 1926    2 Sheets-Sheet 2

Inventor
Benjamin F. Fitch
By Bates Macklin Golrick & Teare
Attorneys

Patented Jan. 31, 1928.

1,657,618

UNITED STATES PATENT OFFICE.

BENJAMIN F. FITCH, OF NEW YORK, N. Y.

APPARATUS FOR HANDLING FREIGHT.

Application filed November 4, 1926. Serial No. 146,124.

This invention relates to apparatus for handling freight which is stored in containers comprising removable automobile bodies. The weight of a removable automobile body when loaded with freight is such that an overhead crane has been regarded as necessary for transferring the body between a truck and a platform. An overhead crane, however, is not adapted for use in every location, but in some places an industrial power lift truck may be employed to good advantage. A truck of this nature is illustrated, described and claimed in my copending application, Serial No. 122,310, filed July 14, 1926.

Briefly the industrial truck shown in my copending application includes a pair of arms which are arranged to extend along opposite sides of a removable truck body and also includes mechanism for raising the body a slight distance from its support, and then transporting it to any desired place on the platform, or to a truck alongside the platform. Where a truck pit is disposed alongside a platform, then provision may be made for enabling the arms of the industrial truck to extend alongside the body, raise it and remove it from a truck positioned in the pit. The installation of truck pits, however, not only necessitates considerable expense, but also is impractical in certain places. Moreover, the use of truck pits necessitates considerable skill by a truck operator to manipulate a truck so as to position it properly within the pit.

The principal object of the present invention is to provide means for expediting the transfer of a body between a truck and platform by use of an industrial truck which straddles the load, without necessitating the construction of truck pits alongside the platform. In this connection my invention is directed toward the provision of means which may be moved relatively to the platform so as to provide a shiftable trackway for the industrial truck, and thus to obviate the necessity for backing the truck at an exact angle with reference to the edge of the platform.

A further object of the present invention contemplates the provision of shiftable trackways which can be readily moved by hand and adjusted to suit various positions of a truck with reference to the platform, yet which has sufficient mechanical strength to support a loaded body upon an industrial truck.

Figure 1:
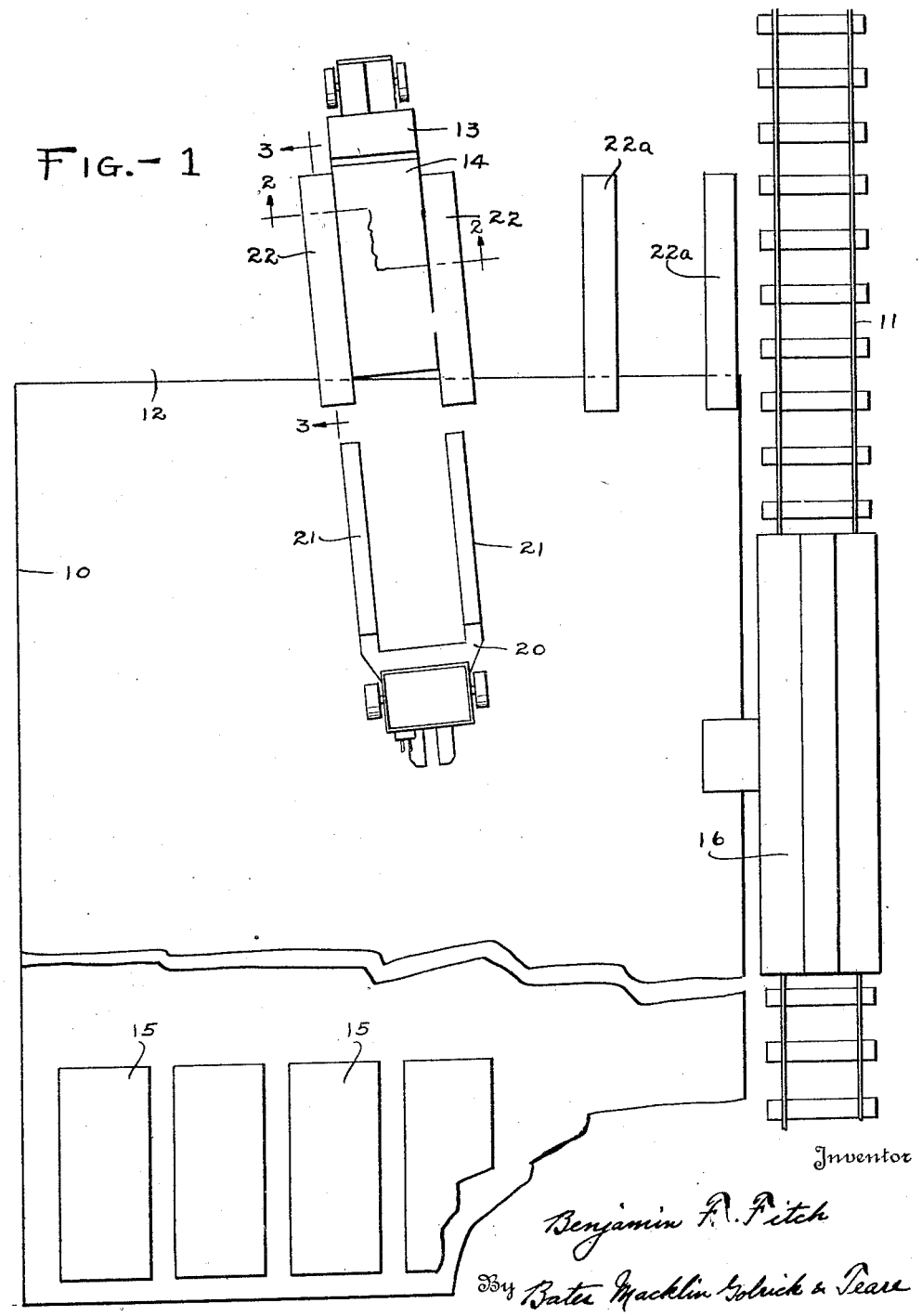
Figure 2:
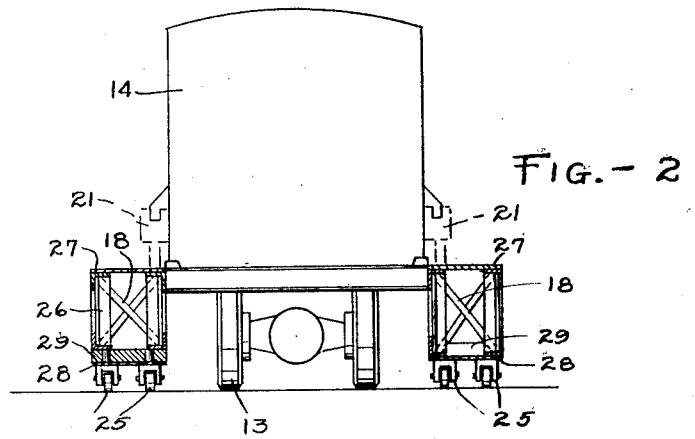
Figure 3:
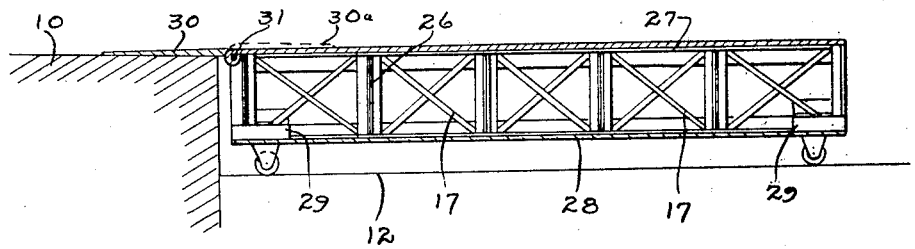

The preferred means for carrying out my invention as illustrated in the drawings, wherein Fig. 1 is a plan view showing a platform layout including my invention; and Figs. 2 and 3 are sections taken on planes indicated by the correspondingly numbered lines in Fig. 1.

In Fig. 1, I have illustrated a freight platform 10 as having a set of railway tracks 11 extending along one side thereof, and as having a street or truck runway 12 extending along one end thereof. The runway has sufficient width to permit a motor truck indicated at 13, to back against the end of the platform, without interfering materially with the normal flow of traffic along the street. The truck illustrated has a removable body 14 adapted to be transferred from the truck to the platform in the usual way. Other removable bodies are indicated at 15 upon the platform adjacent a railway car 16, and in such position that freight may be readily transported by hand between the bodies and the car. A power lift industrial truck, illustrated in general at 20, is shown on the platform near the motor truck, and as being in position to be moved into engagement with the body for raising it from the truck and depositing it upon the platform.

The truck shown in Fig. 1 is disposed at an oblique angle with reference to the platform edge, and in order therefore to permit the arms 21 on the truck to extend alongside of and in close engagement with the body, I provide portable trackways which normally stand in the truck runway, but are adapted to be moved by hand in close proximity to the sides of the motor truck, and against the edge of the platform. In Fig. 1, a pair of such shiftable trackways are indicated at 22 adjacent the truck, while another pair indicated at 22ª are disposed between the truck and the railway tracks. This last mentioned pair are in position to be shifted to accommodate another motor truck which may arrive at the platform.

Each shiftable trackway in the preferred form, embodies a carriage or table which is a fabricated construction having top and bottom plates 27 and 28 respectively, which are connected at spaced intervals by vertically extending angle beams 26 and are reinforced in one direction by diagonal braces 17 and in another direction by diagonal braces 18. The upper plate provides a smooth trackway for the industrial truck, while the lower plate supports bearing blocks 29 in which the casters are journalled.

To permit close contact to be made between the end of each trackway and the platform, I have shown each trackway as having an apron 30 which is hinged at 31 to the top plate. Each apron may be normally carried on the trackway in the position shown by the broken lines 30ᵃ in Fig. 3, but is adapted to be swung to the full line position for bridging the intervening space between the end of the trackway and the edge of the platform. These trackways may be readily shifted by hand into engagement with the side of a truck in an expeditious manner. After a truck has been brought to the platform edge, then the aprons may be swung over onto the platform, so as to provide trackways which are substantially a continuation of the platform surfaces. If desired, the trackways may be locked in any convenient manner (not shown) to the truck frame for preventing lateral shifting of the trackways during the loading and unloading operations.

By means of my invention a truck having a loaded body thereon may be backed against the platform, while the portable trackways are spaced from the proposed unloading position of the truck, and then the trackways may be readily shifted by hand alongside the truck. The industrial truck may then be moved over the trackways into engagement with the load and then caused to raise the load and travel with it onto the platform, whereupon another industrial truck may deposit another body upon the motor truck. The motor truck may thus arrive at the platform, transfer the load and then depart within a minimum period of time, without necessitating such careful manipulation of the truck, as would be necessary to back it into a pit. After a truck has left the platform another truck may enter the space between one trackway 22 and another trackway 22ᵃ whereupon adjustments may be quickly made to accommodate the position of the truck. I may thus provide for the quick transfer of automobile bodies without necessitating extensive changes in platform construction, and without necessitating the use of overhead cranes for enabling such transfers to be made.

I claim:

1. In combination, a freight platform, a truck runway adjacent thereto, a pair of portable trackways positioned on the runway and adapted to be moved alongside a truck positioned on the runway, for providing an extension of the platform along opposite sides of the truck.

2. In combination, a freight platform, a truck runway adjacent thereto, and a pair of wheeled carriages positioned on the runway, said carriages having a width sufficient to provide a substantial continuation of the platform along opposite sides of a truck positioned on the runway.

3. In combination, a freight platform, a truck runway extending along one edge thereof, a truck positioned in the runway and having provision for receiving a removable body, and a wheeled carriage positioned on the runway on each side of the truck, said carriages having a length substantially equal to the length of the truck body to provide a continuation of the platform surface along opposite sides of the body.

4. In combination, a platform, a truck runway associated therewith, a motor truck positioned on the runway adjacent the platform, and having a removable body associated therewith, and means shiftable with reference to the platform and supported on the runway, said means providing a trackway for an industrial truck along opposite sides of said motor truck, for enabling said body to be raised from the motor truck and transported to the platform.

5. In combination, a platform, a truck runway associated therewith, a motor truck positioned in the runway and having a removable body carried thereby, and shiftable members supported on the runway, each of said members having a portion thereof resting on the platform and providing a trackway for an industrial truck along each side of the motor truck.

6. In combination, a platform, a truck runway associated therewith, a motor truck positioned in the runway and having a removable body carried thereby, and shiftable members supported on the runway, each of said members having a plate hinged thereto adjacent one end thereof, said plates being adapted to be swung about the hinge connection and to rest upon the platform so as to provide substantially a continuation of the platform on each side of the truck.

In testimony whereof, I hereunto affix my signature.

BENJAMIN F. FITCH.